US007892636B2

(12) United States Patent
Miller et al.

(10) Patent No.: US 7,892,636 B2
(45) Date of Patent: Feb. 22, 2011

(54) CARBON FOAM WITH SUPPLEMENTAL MATERIAL

(75) Inventors: Douglas J. Miller, North Olmsted, OH (US); David M. Kaschak, Olmsted Falls, OH (US); Richard L. Shao, North Royalton, OH (US)

(73) Assignee: GrafTech International Holdings Inc., Parma, OH (US)

( * ) Notice: Subject to any disclaimer, the term of this patent is extended or adjusted under 35 U.S.C. 154(b) by 295 days.

(21) Appl. No.: 11/742,807

(22) Filed: May 1, 2007

(65) Prior Publication Data

US 2008/0275150 A1 Nov. 6, 2008

(51) Int. Cl.
B32B 3/08 (2006.01)
C08F 2/48 (2006.01)
C08J 7/16 (2006.01)

(52) U.S. Cl. ............... 428/306.6; 428/305.5; 428/308.4; 428/315.5; 428/315.7; 427/487; 427/471; 427/491; 427/508; 423/445 R

(58) Field of Classification Search ............... 428/305.5, 428/306.6, 308.4, 315.5, 315.7; 521/80; 427/471, 487, 491, 508; 423/445 R
See application file for complete search history.

(56) References Cited

U.S. PATENT DOCUMENTS

| 3,006,829 | A | * | 10/1961 | Cook et al. ................ 521/50.5 |
| 3,302,399 | A | | 2/1967 | Tini et al. .................... 60/39.7 |
| 3,302,909 | A | | 2/1967 | Glassman .................... 248/44 |
| 3,309,437 | A | | 3/1967 | Harnett ........................ 264/29 |
| 3,387,940 | A | | 6/1968 | McHenry et al. ........... 23/209.2 |
| 3,632,385 | A | | 1/1972 | Schmitt et al. ................ 117/46 |
| RE28,574 | E | | 10/1975 | Ruoff .......................... 425/78 |
| 3,960,761 | A | | 6/1976 | Burger et al. ................ 252/421 |
| 4,190,637 | A | | 2/1980 | Kennedy .................... 423/448 |
| 4,619,796 | A | | 10/1986 | Awata et al. ................ 264/29.4 |
| 4,681,718 | A | | 7/1987 | Oldham ...................... 264/102 |
| 4,806,290 | A | * | 2/1989 | Hopper et al. ................ 264/28 |
| 4,851,280 | A | | 7/1989 | Gupta ......................... 428/246 |
| 4,851,285 | A | | 7/1989 | Brotz |
| 4,879,182 | A | | 11/1989 | Presswood et al. .......... 428/408 |
| 4,966,919 | A | * | 10/1990 | Williams et al. ............... 521/54 |
| 4,992,254 | A | | 2/1991 | Kong .......................... 423/449 |
| 5,047,225 | A | | 9/1991 | Kong ........................ 423/447.2 |
| 5,211,786 | A | | 5/1993 | Enloe et al. ................... 156/89 |
| 5,282,734 | A | | 2/1994 | Pastureau et al. ............ 425/393 |
| 5,358,802 | A | | 10/1994 | Mayer et al. ................ 429/218 |
| 5,648,027 | A | | 7/1997 | Tajiri et al. .................... 264/43 |
| 5,686,038 | A | | 11/1997 | Christensen et al. ........ 264/257 |
| 5,709,893 | A | | 1/1998 | McCarville et al. ......... 425/389 |
| 5,730,915 | A | | 3/1998 | Cornie ....................... 264/29.1 |
| 5,868,974 | A | | 2/1999 | Kearns ...................... 264/29.6 |
| 5,888,469 | A | | 3/1999 | Stiller et al. ................. 423/445 |
| 5,937,932 | A | | 8/1999 | Cornie ....................... 164/526 |
| 5,945,084 | A | | 8/1999 | Droege ..................... 423/447.4 |
| 5,961,814 | A | | 10/1999 | Kearns ......................... 208/39 |
| 5,984,256 | A | | 11/1999 | Endo ........................ 249/114.1 |
| 6,024,555 | A | | 2/2000 | Goodridge et al. .......... 425/394 |
| 6,033,506 | A | | 3/2000 | Klett ............................ 156/78 |
| 6,093,245 | A | | 7/2000 | Hammond et al. .......... 117/200 |
| 6,099,792 | A | | 8/2000 | Ganguli et al. .............. 264/621 |
| 6,103,149 | A | | 8/2000 | Stankiewicz ................ 264/29.1 |
| 6,183,854 | B1 | | 2/2001 | Stiller et al. ............. 428/312.2 |
| 6,217,800 | B1 | | 4/2001 | Hayward .................... 264/29.1 |
| 6,241,957 | B1 | | 6/2001 | Stiller et al. ................. 423/448 |
| 6,323,160 | B1 | | 11/2001 | Murdie et al. ............... 508/109 |
| 6,344,159 | B1 | | 2/2002 | Klett ......................... 264/29.7 |
| 6,346,226 | B1 | | 2/2002 | Stiller et al. ................. 423/448 |
| 6,387,343 | B1 | | 5/2002 | Klett ......................... 423/448 |
| 6,399,149 | B1 | | 6/2002 | Klett et al. .................. 427/230 |
| 6,506,354 | B1 | | 1/2003 | Stiller et al. ................. 423/445 |
| 6,576,168 | B2 | | 6/2003 | Hardcastle et al. ......... 264/29.1 |
| 6,656,238 | B1 | | 12/2003 | Rogers et al. ................. 44/620 |
| 6,776,936 | B2 | | 8/2004 | Hardcastle et al. ......... 264/29.1 |
| 6,849,098 | B1 | | 2/2005 | Joseph et al. ................. 44/620 |
| 7,033,703 | B2 | * | 4/2006 | Kelley et al. ................ 429/245 |
| 2002/0190414 | A1 | | 12/2002 | Hardcastle et al. |
| 2006/0014908 | A1 | | 1/2006 | Rotermund et al. |
| 2006/0086043 | A1 | | 4/2006 | Miller et al. |
| 2006/0159905 | A1 | | 7/2006 | Shao et al. |
| 2006/0240241 | A1 | * | 10/2006 | Chang et al. ............. 428/304.4 |

FOREIGN PATENT DOCUMENTS

WO 2008/020852 A1 2/2008

OTHER PUBLICATIONS

GB Patent Specification 1,489,690, Application No. 28255/75, filed Jul. 4, 1975 titled "Briquetting Coal".
WO 2006/076556, publication date Jul. 20, 2006.
"A Novel Carbon Fiber Based Porous Carbon Monolith" by T.D. Burchell, J.W. Klett, and C.E. Weaver, Proceedings of the Ninth Annual Conference on Fossil Energy Materials, Oak Ridge, TN, May 16-18, 1995.

(Continued)

Primary Examiner—Hai Vo
(74) Attorney, Agent, or Firm—Waddey & Patterson, P.C.; James R. Cartiglia

(57) ABSTRACT

A carbon foam composite including a carbon foam skeleton having a supplemental material therein, the composite useful for, inter alia, a variety of applications including applications requiring durability and water resistance. Also included is a method for making such carbon foam composite materials.

7 Claims, No Drawings

OTHER PUBLICATIONS

Kirk-Othmer, Encyclopedia of Chemical Technology, 4$^{th}$ ed., vol. 6, John Wiley & Sons, Application of Coal Petrology and Petrography, pp. 429-434 and 454-455, 1993.

POCO Graphite Foam, Properties and Characteristics, Jun. 29, 2001.

High-Performance Composites, Sep. 2004, p. 25.

Modifications of Phenolic Precursor Carbon Foam, R.A. Mercuri and J.M. Criscione, Fuel Division of American Chemical Society, 156th Annual Meeting, Proceedings of 9th Carbon Conference, Jun. 16-20, 1969, pp. 206 and 207.

High Thermal Conductivity, Mesophase Pitch-Derived Carbon Foam, 43rd International SAMPE Symposium, May 31-Jun. 4, 1998, pp. 745, 746.

Microcellular Pitch-Based Carbon Foams Blown with Helium Gas, Anderson, et al., 43rd International SAMPE Symposium, May 31-Jun. 4, 1998, pp. 756, 758, and 760.

GB-263—Advanced Structural Carbons: Fibers, Foams and Composites, pp. 43-51.

Aztex X-Cor, High Performance, Damage Tolerant Composite Core Material, Oct. 2002.

Polyurethane-infiltrated carbon foams: A coupling of thermal and mechanical properties, 2003, vol. 87, pp. 2348-2355, Journal of Applied Polymer Science, Timothy J. Bunning, et al. (Abstract only).

Chemistry and Physics of Carbon, vol. 1, 1965, Marcel Dekker, Inc., New York, pp. 327-365.

Chemistry and Physics of Carbon, vol. 4, 1968, Marcel Dekker, Inc., New York, pp. 286-383.

Chemistry and Physics of Carbon, vol. 7, 1971, Marcel Dekker, Inc., New York, pp. 82-105.

* cited by examiner

CARBON FOAM WITH SUPPLEMENTAL MATERIAL

BACKGROUND OF THE INVENTION

1. Technical Field

The present invention relates to carbon foam containing supplemental materials for modifying the surface energy or fluid affinity characteristics of the foam, to provide, e.g., durable and water resistant materials for high temperature applications. More particularly, the present invention relates to a parent carbon foam with a porous structure having an additional supplemental material such as a polymeric foam material within the pores of the parent foam. The invention also includes methods for the production of such carbon foam materials.

2. Background Art

Carbon foams have attracted considerable interest recently because of their properties of low density, coupled with either high or low thermal conductivity. Conventionally, carbon foams are prepared by two general routes. Highly graphitizable foams have been produced by thermal treatment of mesophase pitches under high pressure. These foams tend to have high thermal and electrical conductivities. For example, in Klett, U.S. Pat. No. 6,033,506, mesophase pitch is heated while subjected to a pressure of 1000 psi to produce an open-cell foam containing interconnected pores with a size range of 90-200 microns. According to Klett, after heat treatment to 2800° C. the solid portion of the foam develops into a highly crystalline graphitic structure with an interlayer spacing of 0.366 nm. The foam is asserted to have a compressive strength greater than previous foams (3.4 MPa, or 500 psi, for a density of 0.53 gm/cc).

In Hardcastle et al. (U.S. Pat. No. 6,776,936), carbon foams with densities ranging from 0.678-1.5 gm/cc are produced by heating pitch in a mold at pressures up to 800 psi. The foam is alleged to be highly graphitizable and provide high thermal conductivity (on the order of 250 W/m°K).

According to H. J. Anderson et al. in Proceedings of the 43d International SAMPE Meeting, p 756 (1998), carbon foam is produced from mesophase pitch followed by oxidative thermosetting and carbonization to 900° C. The foam has an open cell structure of interconnected pores with varying shapes and with pore diameters ranging from 39 to greater than 480 microns.

Rogers et al., in Proceedings of the 45th SAMPE Conference, pg 293 (2000), describe the preparation of carbon foams from coal-based precursors by heat treatment under high pressure to give materials with densities of 0.35-0.45 g/cc with compressive strengths of 2000-3000 psi (thus a strength/density ratio of about 6000 psi/g/cc). These foams have an open-celled structure of interconnected pores with pore sizes ranging up to 1000 microns. Unlike the mesophase pitch foams described above, they are not highly graphitizable. In a recent publication, the properties of this type of foam were described (High Performance Composites September 2004, pg. 25). The foam has a compressive strength of 800 psi at a density of 0.27 g/cc or a strength to density ratio of 3000 psi/g/cc.

Stiller et al. (U.S. Pat. No. 5,888,469) describes production of carbon foam by pressure heat treatment of a hydrotreated coal extract. These materials are claimed to have high compressive strengths of 600 psi for densities of 0.2-0.4 gm/cc (strength/density ratio of from 1500-3000 psi/g/cc). It is suggested that these foams are stronger than those having a glassy carbon or vitreous nature which are not graphitizable.

Carbon foams can also be produced by direct carbonization of polymers or polymer precursor blends. Mitchell, in U.S. Pat. No. 3,302,999, discusses preparing carbon foams by heating a polyurethane polymer foam at 200-255° C. in air followed by carbonization in an inert atmosphere at 900° C. These foams have densities of 0.085-0.387 g/cc and compressive strengths of 130 to 2040 psi (ratio of strength/density of 1529-5271 psi/g/cc).

In U.S. Pat. No. 5,945,084, Droege described the preparation of open-celled carbon foams by heat treating organic gels derived from hydroxylated benzenes and aldehydes (phenolic resin precursors). The foams have densities of 0.3-0.9 g/cc and are composed of small mesopores with a size range of 2 to 50 nm.

Mercuri et al. (Proceedings of the 9th Carbon Conference, pg. 206 (1969)) prepared carbon foams by pyrolysis of phenolic resins. For foams with a density range of 0.1-0.4 gm/cc, the compressive strength to density ratios were from 2380-6611 psi/g/cc. The pores were ellipsoidal in shape with pore diameters of about 25-75 microns for a carbon foam with a density of 0.25 gm/cc.

Stankiewicz (U.S. Pat. No. 6,103,149) prepares carbon foams with a controlled aspect ratio of 0.6-1.2. The patentee points out that users often require a completely isotropic foam for superior properties with an aspect ratio of 1.0 being ideal. An open-celled carbon foam is produced by impregnation of a polyurethane foam with a carbonizing resin followed by thermal curing and carbonization. The pore aspect ratio of the original polyurethane foam is thus changed from 1.3-1.4 to 0.6-1.2.

Advantageously, carbon foam can be created from a polymeric foam block, particularly a phenolic foam block, which is carbonized in an inert or air-excluded atmosphere. This creates a carbon foam having the density, compressive strength and ratio of compressive strength to density sufficient for high temperature applications. Furthermore, these characteristics allow the carbon foam produced through the carbonization of a polymeric foam block to be employed in high temperature applications such as composite tooling and also allows the foam to be produced in a desired size and configuration or machined for a specific size and shape. Superior carbon foams and the method of producing them through the carbonizing of polymeric blocks are described in U.S. Patent Application Publication No. 20060086043, the disclosure of which is incorporated herein by reference.

With the technology of producing carbon foam becoming more widespread and understood, a variety of attempts have been made to provide additional materials in the porosity of the carbon foam. In U.S. Pat. No. 6,323,160, Murdie et al. describe the preparation of a carbon/carbon composite material made from densified carbon foam. The Murdie et al. patent describes the composite material as being made from an open cell carbon foam preform which is subsequently densified by the addition of the carbonaceous material. Specifically, the carbon foam is densified by chemical vapor deposition, hot isostatic pressing, pressurized impregnation carbonization, vacuum pressure infiltration, pitch or resin injection, or combinations of these densification processes.

Unfortunately, most carbon foams and modified carbon foams produced by the prior art processes do not possess the qualities required for a variety of high temperature applications. Many carbon foams have the problem of water absorption when exposed to wet environments, including environments with a high relative humidity. In addition, there exists the possibility of creating carbon foam materials with a wide variety of different properties which have yet to be fully explored.

What is desired, therefore, is a carbon foam with a controllable cell structure, where introduced into the cell structure is a supplemental material which provides a variety of surface energy and/or fluid affinity properties, including resistance to fluid permeation, thereby making the carbon foam containing the supplemental material suitable for a wide array of applications. Indeed, the ability to create a carbon foam with a much wider variety of characteristics has been found to be necessary for the use of carbon foams in differing environmental conditions. Also desired is a process for producing a carbon foam containing the supplemental material.

SUMMARY OF THE INVENTION

The present invention provides a carbon foam containing a supplemental material, which is uniquely capable of use in a wide variety of applications due to the ability to tailor the surface energy or fluid affinity characteristics of the composite of substrate carbon foam and supplemental material for the specific application. The inventive foam composite has a carbon foam skeleton (sometimes referred to herein as parent foam) exhibiting a density, compressive strength, and compressive strength to density ratio to provide a combination of strength and relatively lightweight characteristics not heretofore seen. In addition, the monolithic nature and bimodal cell structure of the parent foam with a combination of larger and smaller pores, which are relatively spherical, provide a carbon foam skeleton which can be produced in desired size and configuration which can be readily machined.

More particularly, the inventive composite's carbon foam skeleton has a density of about 0.05 to about 0.4 grams per cubic centimeter (g/cc), with a compressive strength of at least about 2000 pounds per square inch (psi) (measured by, for instance, ASTM C695). An important characteristic for the foam when intended for use in a high temperature application is the ratio of strength to density. For many such applications, a ratio of strength to density of at least about 5000 psi/g/cc is required, more preferably at least about 7000 psi/g/cc.

The carbon foam skeleton should have a relatively uniform distribution of pores in order to provide the required high compressive strength. In addition, the pores should be relatively isotropic, by which is meant that the pores are relatively spherical, meaning that the pores have, on average, an aspect ratio of between about 1.0 (which represents a perfect spherical geometry) and about 1.5, more preferably between about 1.0 and about 1.25. The aspect ratio is determined by dividing the longer dimension of any pore with its shorter dimension.

The foam should have a total porosity of about 65% to about 95%, more preferably about 70% to about 95%. In addition, it has been found highly advantageous to have a bimodal pore distribution, that is, a combination of two average pore sizes, with the primary fraction being the larger size pores and a minor fraction of smaller size pores. Preferably, of the pores, at least about 90% of the pore volume, more preferably at least about 95% of the pore volume should be the larger size fraction, and at least about 1% of the pore volume, more preferably from about 2% to about 10% of the pore volume, should be the smaller size fraction.

The larger pore fraction of the bimodal pore distribution in the carbon foam skeleton should be about 10 to about 150 microns in diameter, more preferably about 15 to about 95 microns in diameter, most preferably about 25 to about 95 microns in diameter. The smaller fraction of pores should comprise pores that have a diameter of about 0.8 to about 3.5 microns, more preferably about 1 to about 2 microns. The nature of the carbon foam skeleton provides the structure of an open cell design which allows for the permeation of a supplemental material within the carbon foam skeleton's interior structure.

Advantageously, to produce the carbon foam skeletons, a polymeric foam block, particularly a phenolic foam block, is carbonized in an inert or air-excluded atmosphere, at temperatures which can range from about 500° C., more preferably at least about 800° C., up to about 3200° C. to prepare carbon foams for the subsequent infiltration of supplemental materials.

The supplemental material is preferably a polymeric foam located inside the pores of the carbon foam skeleton to enhance or alter the foam's fluid affinity characteristics. Monomeric precursors such as polyvinyl alcohol, polyvinyl chloride, polystyrene, or polyimides can be foamed inside the pores of the foam skeleton. Alternatively, polyolefins such as polymethylene from diazo precursors can be used to spontaneously grow inside the pores of the carbon foam skeleton. Furthermore, the polymer precursors which will be subsequently foamed inside the carbon foam skeleton can possess different properties depending upon the intended application of the carbon foam composite. The carbon foam skeleton's pores could be coated or filled on the inside with electropolymerizable polymers, an electrodeposition of metals, or by the electroless deposition of metals. Furthermore, graphitizeable precursors could be foamed in the pores of a carbon foam skeleton to make thermally and electrically insulative foam more conductive. Yet furthermore, the supplemental material to be foamed inside the carbon foam skeleton could contain a catalyst material, which upon foaming, could create a high temperature and durable filter for either heavy metal separations or gas separations.

An object of the invention, therefore, is a carbon foam composite material having characteristics which enable it to be employed in a variety of applications.

Another object of the invention is a carbon foam composite having a carbon foam skeleton having the density, compressive strength and ratio of compressive strength to density sufficient for high temperature applications.

Still another object of the invention is a carbon foam composite having a carbon foam skeleton with a porosity and cell structure and distribution of pores to provide for interconnected porosity so that a supplemental material may be inserted into the interior of the carbon foam's skeleton structure.

Yet another object of the invention is a carbon foam material with a carbon foam skeleton which can be produced in a desired size and configuration and which can be readily machined or joined to provide larger carbon foam structures.

Yet a further object of the invention is a polymeric foam located inside the pores of the carbon foam skeleton to change the fluid affinity properties of the parent carbon foam.

Still another object of the invention is a monomeric precursor which can be foamed inside the pores of the carbon foam skeleton to create a carbon foam material which is tougher or more water resistant.

Another object of the invention are supplemental materials which can be used to fill the pores of the carbon foam skeleton to provide a variety of properties including making the foam either more insulative, conductive, or catalytically active.

Yet another object of the invention is a method of producing a carbon foam having pores, with a supplemental material in the pores.

These aspects and others that will become apparent to the artisan upon review of the following description can be accomplished by providing a carbon foam composite article formed of a carbon foam skeleton with a monomeric precursor inserted into the pores of the carbon foam article and subsequently foamed inside the carbon foam skeleton to create a material having physical properties tailored for a specific application. The inventive carbon foam with supplemental material advantageously has a carbon foam skeleton with a density of from about 0.05 to about 0.4, a compressive strength of at least about 2000 psi and a porosity of between about 65% and about 95%. The pores of the carbon foam skeleton used for creation of the carbon foam with supplemental material have, on average, an aspect ratio of between about 1.0 and about 1.5.

Preferably, at least about 90% of the pore volume of the pores have a diameter of between about 10 and about 150 microns; indeed, most preferably at least about 95% of the pore volume of the pores have a diameter of between about 25 and about 95 microns. Advantageously, at least about 1% of the pore volume of the pores have a diameter of between about 0.8 and about 3.5 microns; more preferably, from about 2% to about 10% of the pore volume of the pores have a diameter of about 1 to about 2 microns.

The supplemental material used to fill the pores of the carbon foam skeleton can include monomeric precursors or foamable polyolefins which are foamed inside the pores of the carbon foam to alter the fluid affinity or surface energy characteristics of the carbon foam skeleton. Additionally, supplemental material can include electropolymerizable polymers which can improve the conductive nature of the carbon foam material as well as graphitizeable precursors which can be used to make the carbon foam material more thermally and electrically conductive.

The inventive foam can be produced by first carbonizing a polymer foam article, especially a phenolic foam in an inert or air-excluded atmosphere to create the carbon foam skeleton (sometimes referred to herein as the carbon foam substrate or parent carbon foam). The supplemental material is then inserted into the porosity of the carbon foam skeleton and can be foamed through a pressurization technique or by thermally induced foaming.

It is to be understood that both the foregoing general description and the following detailed description provide embodiments of the invention and are intended to provide an overview or framework of understanding to nature and character of the invention as it is claimed.

DETAILED DESCRIPTION OF THE PREFERRED EMBODIMENTS

Carbon foam for use as the carbon foam skeletons in accordance with the present invention are prepared from polymeric foams, such as polyurethane foams or phenolic foams, with phenolic foams being preferred. Phenolic resins are a large family of polymers and oligomers, composed of a wide variety of structures based on the reaction products of phenols with formaldehyde. Phenolic resins are prepared by the reaction of phenol or substituted phenol with an aldehyde, especially formaldehyde, in the presence of an acidic or basic catalyst. Phenolic resin foam is a cured system composed of open and closed cells. The resins are generally aqueous resoles catalyzed by sodium hydroxide at a formaldehyde: phenol ratio which can vary, but is preferably about 2:1. Free phenol and formaldehyde content should be low, although urea may be used as a formaldehyde scavenger.

The foam is prepared by adjusting the water content of the resin and adding a surfactant (eg, an ethoxylated nonionic), a blowing agent (eg, pentane, methylene chloride, or chlorofluorocarbon), and a catalyst (eg, toluenesulfonic acid or phenolsulfonic acid). The sulfonic acid catalyzes the reaction, while the exotherm causes the blowing agent, emulsified in the resin, to evaporate and expand the foam. The surfactant controls the cell size as well as the ratio of open-to-closed cell units. Both batch and continuous processes are employed. In the continuous process, the machinery is similar to that used for continuous polyurethane foam. The properties of the foam depend mainly on density and the cell structure.

The preferred phenol is resorcinol, however, other phenols of the kind which are able to form condensation products with aldehydes can also be used. Such phenols include monohydric and polyhydric phenols, pyrocatechol, hydroquinone, alkyl substituted phenols, such as, for example, cresols or xylenols; polynuclear monohydric or polyhydric phenols, such as, for example, naphthols, p,p'-dihydrexydiphenyl dimethyl methane or hydroxyanthracenes.

The phenols used to make the foam starting material can also be used in admixture with non-phenolic compounds which are able to react with aldehydes in the same way as phenol.

The preferred aldehyde for use in the solution is formaldehyde. Other suitable aldehydes include those which will react with phenols in the same manner. These include, for example, acetaldehyde and benzaldehyde.

In general, the phenols and aldehydes which can be used in the process of the invention are those described in U.S. Pat. Nos. 3,960,761 and 5,047,225, the disclosures of which are incorporated herein by reference.

The polymeric foam used as the starting material in the production of the carbon foam skeleton for the inventive material should have an initial density which mirrors the desired final density for the carbon foam skeleton which is to be formed. In other words, the polymeric foam should have a density of about 0.1 to about 0.6 g/cc, more preferably about 0.1 to about 0.4 g/cc.

In order to convert the polymeric foam to carbon foam, the foam is carbonized by heating to a temperature of from about 500° C., more preferably at least about 800° C., up to about 3200° C., in an inert or air-excluded atmosphere, such as in the presence of nitrogen. The heating rate should be controlled such that the polymer foam is brought to the desired temperature over a period of several days, since the polymeric foam can shrink by as much as about 50% or more during carbonization. Care should be taken to ensure uniform heating of the polymer foam piece for effective carbonization.

By use of a polymeric foam heated in an inert or air-excluded environment, a non-graphitizing glassy carbon foam is obtained, which has the approximate density of the starting polymer foam, but a compressive strength of at least about 2000 psi and, significantly, a ratio of strength to density which can be about 5000 psi/g/cc or higher, more preferably at least about 7000 psi/g/cc. The carbon foam has a relatively uniform distribution of isotropic pores having, on average, an aspect ratio of between about 1.0 and about 1.5, more preferably between about 1.0 and about 1.25.

The resulting carbon foam has a total porosity of about 65% to about 95%, more preferably about 70% to about 95%. Typically, characteristics such as porosity and individual pore size and shape are measured optically, such as by use of an epoxy microscopy mount using bright field illumination, and are determined using commercially available software, such as Image-Pro Software available from MediaCybernetic of Silver Springs, Md.

Alternatively, carbon foams for the carbon foam skeleton of the inventive material may be produced by the thermal treatment of mesophase pitches under high pressure. This method of producing carbon foam results in a carbon foam with an open celled foam structure having a highly interconnected porosity making these foams well suited for the impregnation of a supplemental material into the inner porosity of the carbon foams.

The supplemental materials chosen to fill the pores of the carbon foam skeleton may be selected from a variety of precursors which can impart different characteristics to the inventive carbon foam composite. One such supplemental material is an electropolymerizable polymer which provides a stable and strong electro-conducting characteristic to the inventive carbon foam material. Furthermore, the supplemental material may include a deposition of metal within the pores of the carbon foam skeleton. Specifically, the deposition may include an electroless deposition of a conductive material onto the inner surface of the pores of the carbon foam skeleton by way of reduction of metal ions in a chemical solution bath. Also, a conductive material may be deposited into the pores of the carbon foam skeleton by electrodepositon in which the reduction of a conductive material results in the deposition of the conductive material on the inner surface of the pores of the carbon foam skeleton.

In another embodiment, the supplemental material may be a graphitizeable precursor which can be foamed in the pores of the carbon skeleton to make the inventive material more thermally and electrically conductive. Such precursors include both phenolic foams as well as mesophase pitch materials which can be converted into carbonaceous substances upon sufficient thermal exposure. In a preferred embodiment, the precursor is a synthetic thermosetting resin such as a phenol formaldehyde resin including both novolacs and resoles.

The supplemental material may also include a variety of catalysts, which after integration into the carbon foam skeleton, would provide catalytic properties to the inventive material. These catalysts may include the transition metals which are known to those skilled in the art for use as either homogeneous or heterogeneous catalysts. Furthermore, the supplemental material may contain catalytic complexes which can enable the inventive carbon foam material to be used for heavy metal separations.

The supplemental material for use inside the pores of the carbon foam skeleton is most often a monomeric precursor which can be foamed inside the pores of the carbon foam skeleton. These precursors include polyvinyl alcohol, polyvinyl chloride, polyvinyl butyral, polyurethane resins, polystyrene, acrylics, epoxies, phenolics, polyimides, polymethylene, polystyrene, polyolefins, polyurethane, and combinations thereof. Once these precursors are inside the pores of the carbon foam skeleton, the precursors can be foamed through a variety of methods. For example, polymethylene from diazo precursors can spontaneously foam inside the pores of the carbon foam skeleton.

The use of these precursors to create polymeric foams solves a variety of problems with the use of carbon foam materials in different environments. For instance, the inventive foam material can be rendered more water resistant and also more durable without adding significant weight to the carbon foam skeleton. Furthermore, by including a variety of material such as catalysts or conductive elements within the polymeric foam, an inventive carbon foam composite is created with a variety of new properties.

Preferably, a plurality of the pores of the carbon foam skeleton are filled with a closed cell polymer foam from one of the aforementioned monomeric precursors. In a preferred embodiment of creating carbon foams containing a supplemental material within the pores of the carbon foam, a thermoplastic polymer is utilized. The polymer is injected into the carbon foam so that the polymer fills the pores of the carbon foam skeleton. Subsequently, the loaded carbon foam material is pressurized at a pre-set temperature so that gas is dissolved within the precursor material. The pressure is then released causing the dissolved gases within the precursor to become undissolved and, thus, foam the precursor material in the pores of the carbon foam skeleton. The precursors used in this process for creating a carbon foam having pores with the supplemental material in the pores may include a hydrophobic thermal plastic polymer such as polystyrene.

The precursors used in this process may be injected into the porosity of the carbon foam skeleton through vacuum infusion in which a vacuum is utilized to pull the supplemental material into the pores of the carbon foam skeleton.

In a further embodiment, the thermoplastic polymer like a polyolefin may be inserted into the pores of the carbon foam skeleton by pressure filling in which a difference in pressure gradients is utilized to move the supplemental material into the pores of the carbon foam skeleton.

The pressurization of the carbon foam skeleton containing the precursor supplemental material should be by gas containing carbon dioxide. This gas may also include hydrochlorofluorocarbons as well as hydrocarbons such as hexane for use as internal chemical blowing agents for facilitating the foaming of the precursor material.

In yet a further embodiment, a carbon foam having pores with a supplemental material therein may be created by injecting a resin premixed with the liquid hydrocarbon into the carbon foam skeleton and subsequently heating the carbon foam containing the resin premixed with the liquid hydrocarbon to thermally induce the resin within the carbon foam skeleton to foam. Upon filling the foam skeleton with the resin premixed with the hexane, the temperature is increased to initiate thermally induced foam of the reacting resin. Such resins can include polyurethane as well as phenolaldehyde resins such as novolacs and resoles. Optionally, the supplemental material may only be inserted in the outermost portion of the carbon foam skeleton so as to occupy the exterior porosity of the carbon foam. This technique creates a carbon foam composite material which is externally sealed while maintaining an open interior porosity. More specifically, the supplemental material can be provided into only those pores at the surface of the carbon foam skeleton; alternatively, the supplemental material can be provided to those pores within two cell diameters of the surface of the skeleton to act as a block or chemical inhibitor to fluid transport into the skeleton. For instance, when a resin or other cement material is being applied to the surface of the parent foam in order to provide for the formation of laminates or to seal the foam, the supplemental material can prevent undesirable infiltration of the resin into the internal porosity of the foam.

While the aforementioned processes and articles have described the inventive material as a carbon foam containing a supplemental material, the carbon foam article may also be a graphite foam.

Accordingly, by the practice of the present invention, an inventive foam having heretofore unrecognized characteristics is prepared. These carbon foams containing supplemental materials exhibit exceptionally high compressive strength to density while containing a supplemental material which can impart a variety of physical and chemical characteristics to the carbon foam. In the preferred embodiments, the supplemental material acts to modify the fluid affinity of the parent carbon foam, in order to reduce both active and passive wettability of the foam.

The disclosures of all cited patents and publications referred to herein are incorporated herein by reference.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A carbon foam composite article comprising a carbon foam having a pore distribution whereby at least about 90% of the pore volume have a diameter of about 10 to about 150 microns and at least about 1% of the pore volume have a diameter of about 0.8 to about 3.5 microns and a supplemental material comprising a mesophase pitch material within pores of the carbon foam such that the supplemental material only fills pores of the carbon foam within two cell diameters of the surface and the carbon foam composite is externally sealed while maintaining an open interior porosity, wherein the surface energy or fluid affinity of the carbon foam composite article differs from that of the carbon foam.

2. The article of claim 1 wherein the supplemental material further comprises a polymeric foam created from precursors foamed inside the pores.

3. The article of claim 2 wherein the polymeric foam comprises at least one precursor selected from the group consisting of polyvinyl alcohol, polyvinyl chloride, polyvinyl butyral, a polyurethane resin, polystyrene, an acrylic, an epoxy, a phenolic, a polyimide, polymethylene, polystyrene, a polyolefin, polyurethane, and combinations thereof.

4. A process for producing carbon foam having pores with a supplemental material in the pores, comprising providing a parent carbon foam having a pore distribution whereby at least about 90% of the pore volume have a diameter of about 10 to about 150 microns and at least about 1% of the pore volume have a diameter of about 0.8 to about 3.5 microns and introducing a supplemental material comprising a mesophase pitch material in the pores such that the supplemental material only fills pores of the carbon foam within two cell diameters of the surface and the carbon foam composite is externally sealed while maintaining an open interior porosity, wherein the supplemental material/parent carbon foam composite has a different surface energy or fluid affinity than that of the parent carbon foam.

5. The process of claim 4 wherein the carbon foam is a graphite foam.

6. The process of claim 4 wherein the supplemental material further comprises a polymeric foam created from precursors foamed inside the pores.

7. The process of claim 6 wherein the polymeric foam comprises at least one precursor selected from the group consisting of polyvinyl alcohol, polyvinyl chloride, polyvinyl butyral, a polyurethane resin, polystyrene, an acrylic, an epoxy, a phenolic, a polyimide, polymethylene, polystyrene, a polyolefin, polyurethane, and combinations thereof.

* * * * *